United States Patent Office 3,534,607
Patented Oct. 20, 1970

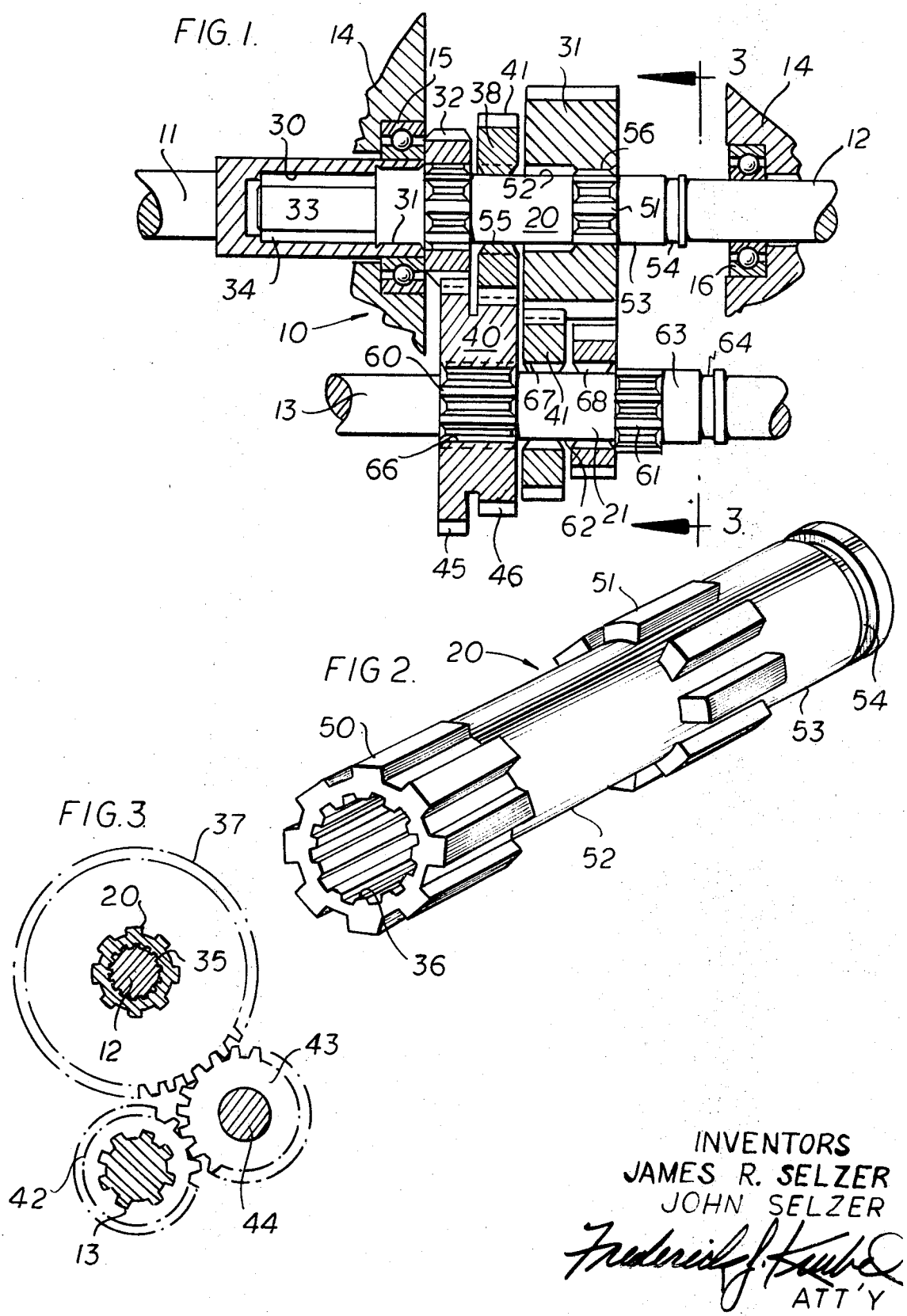

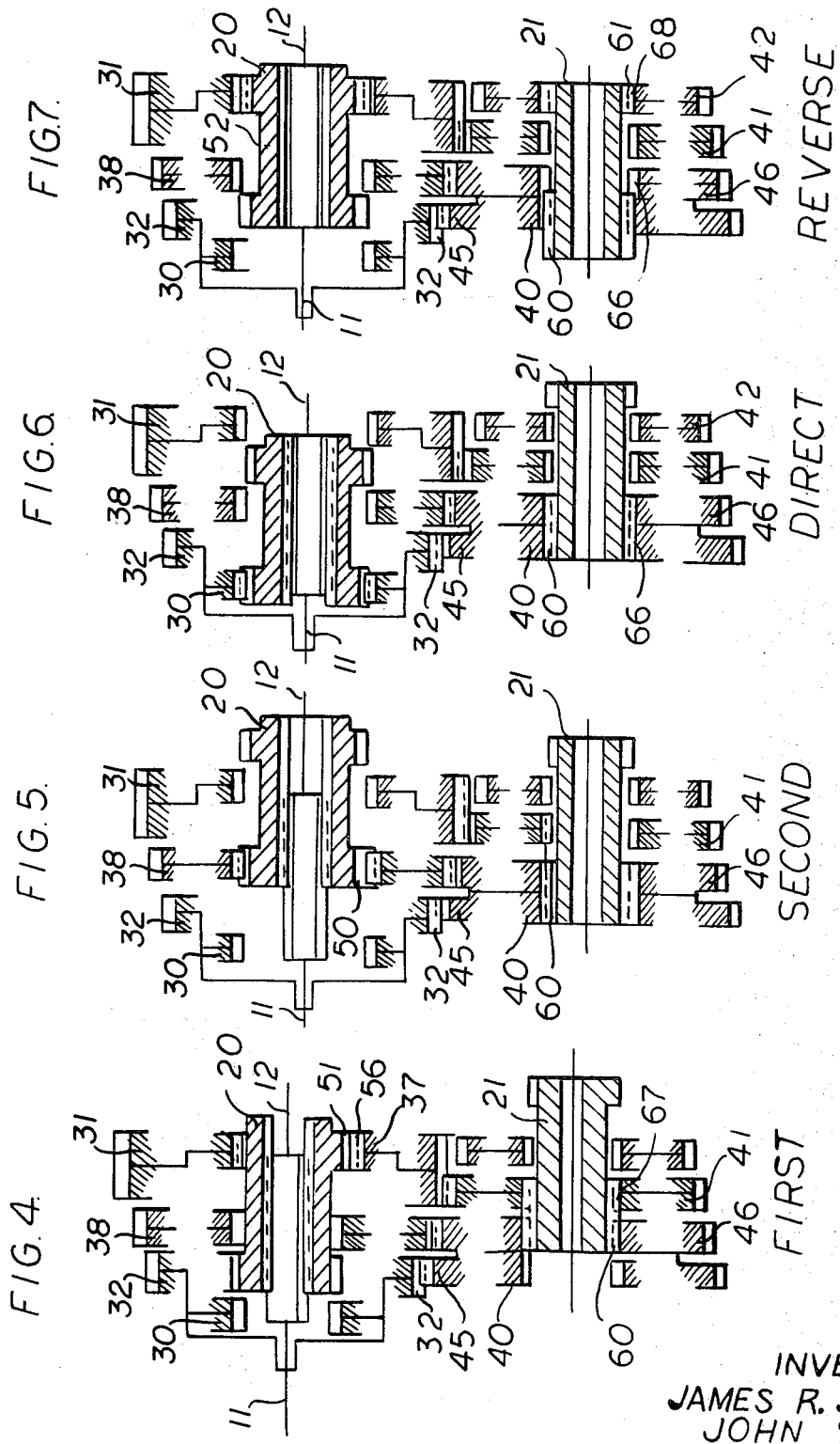

3,534,607
SLIDING TUBE CHANGE-SPEED TRANSMISSION
John Selzer and James R. Selzer, Fort Wayne, Ind., assignors to International Harvester Company, Chicago, Ill., a corporation of Delaware
Filed Sept. 26, 1968, Ser. No. 762,959
Int. Cl. F16h 3/04, 3/26
U.S. Cl. 74—332                               11 Claims

ABSTRACT OF THE DISCLOSURE

A multiple speed transmission employing splined sliding tubes to effectuate the changes in speed ratio, without the need of synchronizers, and of reduced size and weight as compared to conventional transmissions of the same capacity.

---

This invention relates to multiple speed transmissions for motor vehicles and more particularly to a shifting mechanism for use with a countershaft transmission.

Countershaft transmissions for motor vehicles are well known in the art. Such transmissions generally include an input shaft for driving an input gear and an output shaft driven by an output gear. Change speed gearing is carried by one or more parallel countershafts and the various gear ratios are selected by sliding the gears axially into and out of engagement. Synchronizers are generally employed between the gears to bring a mating pair up to nearly the same relative speed before sliding them into engagement and thereby to prevent clashing and stripping of the gears. The space required to accommodate the synchronizers, of necessity, makes the transmission larger than is necessary merely to accomplish the change-speed function. The inclusion of the synchronizers also adds to the complexity, weight, and cost of the transmission.

It is an object of the present invention to provide a change speed transmission having at least two speed ratios and employing a splined sliding tube effective to establish selectively each of the ratios. The gearing to be engaged by the sliding tube rides on the outer surface of the tube in a nonengaged condition and rotates at close to the same angular velocity as the tube. The fact that the gears to be engaged are rotating at nearly the same relative speed as the tube permits engagement of the tube with the gears without requiring synchronizers to prevent clashing.

A further object is to provide a transmission for a motor vehicle having a second splined sliding gear tube carried by a stationary countershaft and effective to establish selectively a low speed drive and a reverse drive condition for the vehicle.

Other objects and advantages of the invention will be more readily apparent when read in connection with the following drawings:

FIG. 1 is a longitudinal sectional view of the transmission of the present invention;
FIG. 2 is an enlarged perspective view of the splined sliding tube used in the transmission;
FIG. 3 is an end view taken on line 3—3 of FIG. 1;
FIG. 4 is a schematic diagram of the transmission in a first speed forward drive condition;
FIG. 5 is a diagram of the second speed forward drive;
FIG. 6 is a diagram showing direct drive condition; and
FIG. 7 is a schematic diagram of the transmission in a reverse drive condition.

Like characters of reference designate like parts in the several views.

A preferred embodiment of the transmission of the present invention is designated generally by the numeral 10 and comprises a driving input shaft 11, an output shaft 12, and a stationary countershaft 13. The input shaft 11 is adapted to be driven by a suitable engine or power source (not shown) and the output shaft 12 is adapted to drive the road wheels of the vehicle through a suitable differential mechanism (not shown). The transmission 10 may be disposed within a suitable casing or housing 14 with the input shaft 11 supported by a bearing 15 and the output shaft 12 supported by a bearing 16.

A sliding gear tube 20 is splined to the output shaft 12, and a sliding gear tube 21 is journalled on the shaft 13. As an alternative design, the tube 21 may be splined to or formed integrally with the shaft 13 provided the shaft 13 is journalled within the casing 14, and permitted to slide longitudinally.

The input shaft 11 is formed at one end with an internal cylindrical bore 30, an internal gear 31 within the bore 30, and an external input gear 32. The bore 30 receives one end 33 of the output shaft 12 and supports it by means of a suitable bearing 34. The output shaft 12 is formed at 35 with longitudinal splines adapted to engage mating splines 36 formed on the interior of the tube 20. The tube 20 carries a relatively long output gear 37 and an intermediate or second speed gear 38 disposed between the gear 32 and gear 37.

The tube 21 carries a compound gear 40, a low speed gear 41, and a reverse gear 42. The reverse gear 42 engages an idler gear 43 journalled on a countershaft 44. The compound gear 40 comprises a relatively large diameter gear 45, which maintains constant engagement with the external gear 32 of the input shaft 11, and a relatively smaller diameter gear 46 which always engages the external gear teeth 47 of the intermediate gear 38. The gear 41 is in constant engagement with the gear 37, and the idler gear 43 is in constant engagement with the reverse gear 42 and the output gear 37.

The sliding tube 20 is formed with external gears or splines 50 and 51, smooth external cylindrical surfaces 52 and 53, and an annular groove 54. The external gear 50 is adapted to engage selectively either the internal gear 31 or with internal splines 55 formed on the gear 38. The gear 51 is adapted to with internal splines 56 formed in the gear 37. When not engaged, the gears 37 and 38 ride freely on the external surfaces 52 or 53. The annular groove 54 is adapted to receive a suitable shift yoke or fork (not shown) capable of producing longitudinal movement of the tube 20.

The tube 21 is similar in construction to the tube 20 and is formed with external gears or splines 60 and 61, smooth cylindrical external surfaces 62 and 63, and an annular groove 64. The external gear 60 is always in engagement with internal splines 66 formed in the gear 40 and may also engage internal splines 67 formed in gear 41. The external gear 61 is adapted to engage or not with internal splines 68 formed in the reverse gear 42. The gears 41 and 42, when not engaged with the gears 60 or 61, ride freely on the surface 62. The annular groove 64 receives a suitable shift yoke (not shown).

Referring now to FIGS. 1, 4, 5, 6 and 7, the various driving speed ratios are obtained as follows:

Neutral—A neutral condition is obtained when the tubes 20 and 21 are in the positions shown in FIG. 1. The input shaft 11 may drive the gear 32 which in turn drives the gear 40 and tube 21. The gear 51 engages the splines 56 of gear 37, however, there is no driving connection to the tube 20 and output shaft 12, consequently, there is no torque transmitted to the road wheels of the vehicle.

First—A first or low speed forward drive condition is established, as shown in FIG. 4, by moving the sliding gear tube 21 to the right. The gear tube 20 remains in the neutral position. Movement of the tube 21 to the right causes the gear 60 to engage the internal splines 67 of gear 41. The driving connection established from the input shaft 11 is through gear 32 which drives gear 40 and tube 21 in the opposite direction about the shaft 13. The gear 60 engaged with the first speed gear 41 drives the output gear 37 in an opposite direction that is the same direction as the input shaft 11. The gear 37 drives the tube 20 and output shaft 12 through the engaged splines 51 and 56. The gear 32 is of a relatively smaller diameter than the gear 45 so that a speed reduction takes place at this engagement. The first speed gear 41 is also of a relatively smaller diameter than gear 45 so that still further speed reduction takes place in driving the output gear 37.

Second—A second or intermediate speed drive condition is established, as shown in FIG. 5, by moving the gear tube 20 to the right. The gear tube 21 is returned to the same position as for neutral. In normal vehicle operating conditions, the shift into second will take place only after the vehicle is started in first and allowed to accelerate up to a normal upper speed limit for first. Under these conditions, the output shaft 12 and gear tube 20 will be rotating and the gear 38 riding on the surface 52 will also be rotating in the same direction and at close to the same speed. The longitudinal engagement of the gear 50 with the splines 55 thus can take place without clash and without the need for synchronizers.

The driving connection from the input shaft 11 is through the gear 42 which drives gear 45, gear 46 which drives gear 38, the engaged splines 50 and 55, tube 20, and splines 36 and 35 to the output shaft 12. The gear 46 is of a relatively larger diameter than gear 41 so that the overall speed reduction through the transmission is not as great as for first.

Direct—A direct or high speed forward drive condition is established, as shown in FIG. 6, by shifting the gear tube 20 to the limit of its motion to the left so as to engage the gear 50 with the internal gear 31. In this condition the driving connection is from the input shaft 11 through the engaged gears 31 and 50, and tube 20 to the output shaft 12. The tube 21 is in its neutral condition, and while its gears may rotate freely, they have no driving connection to the output shaft 12. The shift into direct normally takes place after the vehicle has been accelerated in second up to the speed or load condition suitable to call for such a shift. In such condition, the output shaft 12 and tube 20 will be rotating at a speed close to that of the input shaft 11 so that the tube 20 can be shifted into engagement without clash. It is assumed that normal operator skill will be employed in effectuating such shifts.

Reverse—A reverse drive condition is obtainable, as shown in FIG. 7, by shifting the gear tube 20 into its neutral or first speed position, and shifting the tube 21 to the left so that gear 61 engages the internal splines 68 of the reverse gear 42. In this condition, the input shaft 11 drives the gear 32 which in turn drives the gear 45 in the opposite direction. The gear 45 or 40 carries the tube 21 in the same direction through the engaged splines 60 and 66. The tube 21 drives the gear 42 which in turn drives the idler gear 43 in the opposite direction, or in the same direction as the input shaft 11. The idler gear 43 drives the output gear 37 and output shaft 12 in an opposite direction, which is the reverse direction from the input shaft 11. The vehicle is thus driven in a reverse direction.

The various driving gear ratios described are obtained shifting the gear tubes 20 and 21 into the positions described either manually or through automatically actuated shift forks or yokes (not shown) which engage the grooves 54 and 64 on the gear tubes 20 and 21, respectively. The mechanisms for accomplishing such shifting is not important or required for an understanding of the present invention.

There has been shown end described a preferred embodiment of a new countershaft-type transmission that employs sliding gear tubes to establish the various driving gear ratios, without requiring synchronizers to prevent clashing of the gears. This permits the overall length of the transmission to be about ⅔ as long as a conventional transmission of the same capacity. This also permits of a transmission that is smaller, lighter, less complex, and less expensive than comparable conventional designs.

It is to be understood that the preferred embodiment is by way of example only and is not to be construed as being limited thereto, except insofar as the claims may be so limited.

I claim:

1. In a power transmission mechanism for an automotive vehicle having an input shaft adapted to be driven by the vehicle engine and an output shaft for driving road wheels of the vehicle, the combination comprising:
   a hollow sliding gear tube splined for longitudinal movement to the output shaft and having a first or neutral position in which no driving connection is established between the input and output shafts, said gear tube being drivingly connected to said output shaft at all times;
   change speed gearing driven by the input shaft in a forward direction and engageable by said tube when said tube is moved into a second position to complete a change speed drive condition through the transmission; and
   means for effecting a driving connection between said tube and said input shaft only when said tube is moved to a third position to complete a direct drive condition through the transmission.

2. The transmission of claim 1, in which said tube is formed with an external gear means along a portion of its length for engaging said change speed gearing.

3. The transmission of claim 1, in which said last named means includes an internal gear formed within the input shaft, said internal gear being engageable by said tube to complete said direct drive condition.

4. The transmission of claim 2, in which said tube is formed with a smooth external cylindrical surface throughout a portion of its length, a portion of said change speed gearing being supported for relative rotational movement on said cylindrical surface when not engaged with said external gear means of said tube.

5. The transmission of claim 4, in which said change speed gearing comprises:
   an input gear driven by the input shaft;
   a compound countershaft gear drivingly connected to said input gear; and
   a driven gear selectively drivingly connectible with said tube to provide a driving connection therebetween, said driven gear being in mesh with said compound countershaft gear, said driven gear being supported by said tube for relative rotational movement when drivingly disconnected from said tube.

6. The transmission of claim 2, including means for establishing a forward low drive condition and a reverse drive condition comprising:
   an output gear, said output gear being drivingly connectible to said output shaft and having internal splines formed therein;
   means for selectively driving said output gear in forward and reverse directions; and
   a second external gear formed on said tube, said second external gear being engageable with said internal splines of said output gear when said tube is in its first or neutral position.

7. The transmission of claim 6, in which said means for establishing a forward low drive condition and a reverse drive condition further comprises:
   countershaft gearing drivingly connected to the input shaft; and
   selectively engageable means operable to provide a driving connection between said countershaft gearing and said output gear.

8. The transmission of claim 7, in which said selectively engageable means comprises:
   internal splines formed in said countershaft gearing;
   a stationary countershaft;
   a second gear tube rotatably supported by and longitudinally movable with respect to said countershaft, said second gear tube having an external gear formed thereon and being movable longitudinally between a first or neutral position, a second position, and a third position with respect to said countershaft, said second gear tube external gear being disengaged from said internal splines of said countershaft gearing when said second gear tube is in its first or neutral position and being engaged with said internal splines of said countershaft gearing when in its second and third positions.

9. The transmission of claim 8, in which said second gear tube is formed with a smooth cylindrical surface throughout a portion of its length and wherein said countershaft gearing further includes:
   a low speed gear in mesh with said output gear, said low speed gear being formed with internal splines which ride freely on said smooth surface of said second gear tube when said second gear tube is in its first or neutral position, said internal splines being engageable with said external gear when said second gear tube is moved to its second position to complete a low speed drive condition.

10. The transmission of claim 8, in which said second gear tube is formed with a second external gear and further including:
    an idler gear carried by an idler shaft, said idler gear being in mesh with said output gear and being engageable by said second external gear when said second gear tube is moved to its third position to complete a reverse drive condition.

11. The transmission of claim 10, in which said second gear tube is formed with a smooth cylindrical surface throughout a portion of its length and wherein said countershaft gearing further includes:
    a low speed gear in mesh with said output gear, said low speed gear being formed with internal splines which ride freely on said smooth surfaces when said second gear tube is in its first or neutral position, said internal splines being engageable with said external gear when said second gear tube is moved to its second position to complete a low speed drive condition.

References Cited

UNITED STATES PATENTS

| | | | |
|---|---|---|---|
| 1,842,636 | 1/1932 | Valletta | 74—332 |
| 1,854,082 | 4/1932 | Valletta | 74—332 |
| 1,903,595 | 4/1933 | Moorhouse | 74—332 |
| 1,948,723 | 2/1934 | Lapsley | 74—332 |
| 2,225,174 | 12/1940 | Keller | 74—332 X |

ARTHUR T. McKEON, Primary Examiner

U.S. Cl. X.R.

74—360